United States Patent
Kuo

(10) Patent No.: US 7,100,088 B2
(45) Date of Patent: Aug. 29, 2006

(54) COMPUTER SYSTEM EQUIPPED WITH A BIOS DEBUGGING CARD

(75) Inventor: Hung-Yu Kuo, Hsin-Tien (TW)

(73) Assignee: Via Technologies, Inc., Taipei (TW)

( * ) Notice: Subject to any disclaimer, the term of this patent is extended or adjusted under 35 U.S.C. 154(b) by 595 days.

(21) Appl. No.: 10/608,098

(22) Filed: Jun. 30, 2003

(65) Prior Publication Data

US 2004/0153811 A1    Aug. 5, 2004

(30) Foreign Application Priority Data

Oct. 25, 2002    (TW) ................ 91125219 A

(51) Int. Cl.
*G06F 11/00*    (2006.01)
(52) U.S. Cl. ............................. 714/36; 713/1
(58) Field of Classification Search .................. 714/36; 713/1, 2
See application file for complete search history.

(56) References Cited

U.S. PATENT DOCUMENTS

| | | | | |
|---|---|---|---|---|
| 5,680,556 A | * | 10/1997 | Begun et al. ................ | 710/315 |
| 5,805,882 A | * | 9/1998 | Cooper et al. ................ | 713/2 |
| 5,835,695 A | * | 11/1998 | Noll ................ | 714/6 |
| 5,898,843 A | * | 4/1999 | Crump et al. ................ | 710/100 |
| 5,960,445 A | * | 9/1999 | Tamori et al. ................ | 707/203 |
| 6,003,130 A | * | 12/1999 | Anderson ................ | 713/2 |
| 6,038,663 A | * | 3/2000 | Feldman ................ | 713/1 |
| 6,161,177 A | * | 12/2000 | Anderson ................ | 713/2 |
| 6,175,919 B1 | * | 1/2001 | Ha ................ | 713/100 |
| 6,240,480 B1 | * | 5/2001 | Wong et al. ................ | 710/311 |
| 6,317,828 B1 | * | 11/2001 | Nunn ................ | 713/2 |
| 6,934,873 B1 | * | 8/2005 | Lu et al. ................ | 714/2 |
| 2002/0147941 A1 | * | 10/2002 | Gentile ................ | 714/36 |

FOREIGN PATENT DOCUMENTS

CN    2003458707    *    3/2003

* cited by examiner

Primary Examiner—Robert Beausoliel
Assistant Examiner—Amine Riad
(74) Attorney, Agent, or Firm—Rabin & Berdo, P.C.

(57) ABSTRACT

A method of initializing a computer system equipped with a debugging system. The computer system has a ROM coupled to an expansion bus and stores a first BIOS code, and the debugging system is coupled to a peripheral bus. The method comprises the steps of routing data requests directed to the ROM to a local bus by a CPU, transferring the data requests from the local bus to the peripheral bus via a first bridge, switching a second bridge into normal mode wherein the second bridge is enabled to respond to data requests on the peripheral bus with the first BIOS code stored in ROM to be loaded in the CPU, and switching the second bridge to debugging mode wherein the second bridge is disabled from responding to data requests on the peripheral bus, instead, the debugging system responds to data requests with the second BIOS code to be loaded in the CPU.

20 Claims, 2 Drawing Sheets

COMPUTER SYSTEM EQUIPPED WITH A BIOS DEBUGGING CARD

BACKGROUND OF THE INVENTION

The present invention relates to a computer system and a corresponding operation, and particularly to a computer system and a corresponding method for supporting insertion of a BIOS debugging card. Moreover, the system can be initialized through the debugging card in the event of a ROM BIOS failure.

DESCRIPTION OF THE PRIOR ART

The architecture of most computers is generally defined by functional layers. The lowest layer is the hardware or machine layer. The highest layer is the application program that interfaces with a user. In between the hardware and application program is the system software. The system software itself may be composed of several elements, including: the operating system kernel and shell, device drivers, and, perhaps, a multitasking supervisor.

Most architectures also include a low-level software layer, or Basic Input/Output System (BIOS), between the hardware and the system software. The BIOS provides primitive I/O services, allowing the system and application software to communicate with the hardware by issuing interrupts. Most computing systems are controlled through the use of interrupts. Interrupts can be generated by the microprocessor, by the system hardware, or by software. The BIOS provides a logical handling of the interrupt signals. When an interrupt occurs, control of the computer is transferred to an interrupt vector which defines the "segment:offset" address of the routing in BIOS assigned to the given interrupt number.

BIOS Interrupt Service Routines (ISRs) handle interrupts issued by hardware devices. ISRs use registers in the microprocessor and BIOS data areas. The BIOS Device Service Routines (DSRs) handle software interrupts issued by the INT instruction.

In addition to providing the previously described run-time services, the BIOS should be enabled to initialize and configure the computer when the computer is first turned on. The BIOS runs a startup program called the POST program, which performs a number of tasks, including testing random access memory (RAM), conducting an inventory of the hardware devices installed in the computer, configuring hard and floppy disks, keyboard, and serial and parallel ports, configuring other devices installed in the computer such as CD-ROM drives and sound cards, initializing computer hardware required for computer features such as Plug and Play and Power Management, and running setup if requested.

If prior tasks are successful, the Operating System such as DOS, OS/2, UNIX, or Windows '95 is then loaded by the BIOS.

Since the initialization and configuration of the computer system are complicated, the BIOS or operation system possibly fails to be started due to malfunctions or bugs, especially for the BIOS. Accordingly, chipset manufacturers, the main designers of BIOS, are compelled to concentrate effort in debugging the BIOS code.

During debugging of the BIOS, there is an embarrassing situation that the whole system is halted due to any BIOS error, which make it impossible to debug the BIOS code through the computer system itself. The debugging of the BIOS is conventionally done by logic analysis directly measuring the signals on pins of the chips. This is a time-consuming work.

SUMMARY OF THE INVENTION

The object of the present invention is to provide a computer system supporting insertion of a BIOS debugging card, wherein the whole system can be initialized through the debugging card even if ROM BIOS fails.

The present invention provides a method of initializing a computer system equipped with a debugging system. The computer system has a ROM coupled to an expansion bus and stores a first BIOS code, and the debugging system is coupled to a peripheral bus. The method comprises the steps of routing data requests to the ROM to a local bus by a CPU, transferring the data requests from the local to the peripheral bus by a first bridge, switching a second bridge into a normal mode wherein the second bridge is enabled to respond to data requests on the peripheral bus with the first BIOS code stored in ROM to be loaded inithe CPU, and switching the second bridge to debugging mode wherein the second bridge is disabled from responding to data requests on the peripheral bus, instead, the debugging system responds the data requests with second BIOS code to be loaded in the CPU.

The present invention also provides a computer system capable of being initialized by a debugging system, comprising a CPU, a local, peripheral and expansion bus, wherein the CPU routes data requests to the local bus and the debugging system is coupled to the peripheral bus, a ROM coupled to the expansion bus stores first BIOS code, to which the data requests are directed, a first bridge transferring the data requests from the local bus to the peripheral bus, and a second bridge switched between a normal mode wherein the second bridge is enabled to respond to data requests on the peripheral bus with the first BIOS code in the ROM to be loaded in the CPU and a debugging mode wherein the second bridge is disabled from responding to data requests on the peripheral bus, instead, the debugging system responds the data requests with the second BIOS code to be loaded in the CPU.

The present invention further provides a peripheral/expansion bus bridge in a computer system capable of being initialized by a debugging system, wherein the computer system further comprises a CPU, a local, peripheral and expansion bus, a local/peripheral bus bridge, and a ROM coupled to the expansion bus to store a first BIOS code, and the debugging system is coupled to the peripheral bus, the peripheral/expansion bus bridge being able to switch the peripheral/expansion bus bridge between a normal and debugging mode, and a decoder to decode addresses carried by data requests of the CPU directed to the ROM, whereby the peripheral/expansion bus bridge sends a device select signal to the peripheral bus and retrieves the first BIOS code in the ROM corresponding to the addresses to be loaded in the CPU when the peripheral/expansion bus bridge is switched into the normal mode, and disabled when the peripheral/expansion bus bridge is switched to debugging mode, wherein, the debugging system instead responds the data requests with second BIOS code to be loaded in the CPU when the peripheral/expansion bus bridge is switched to debugging mode.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
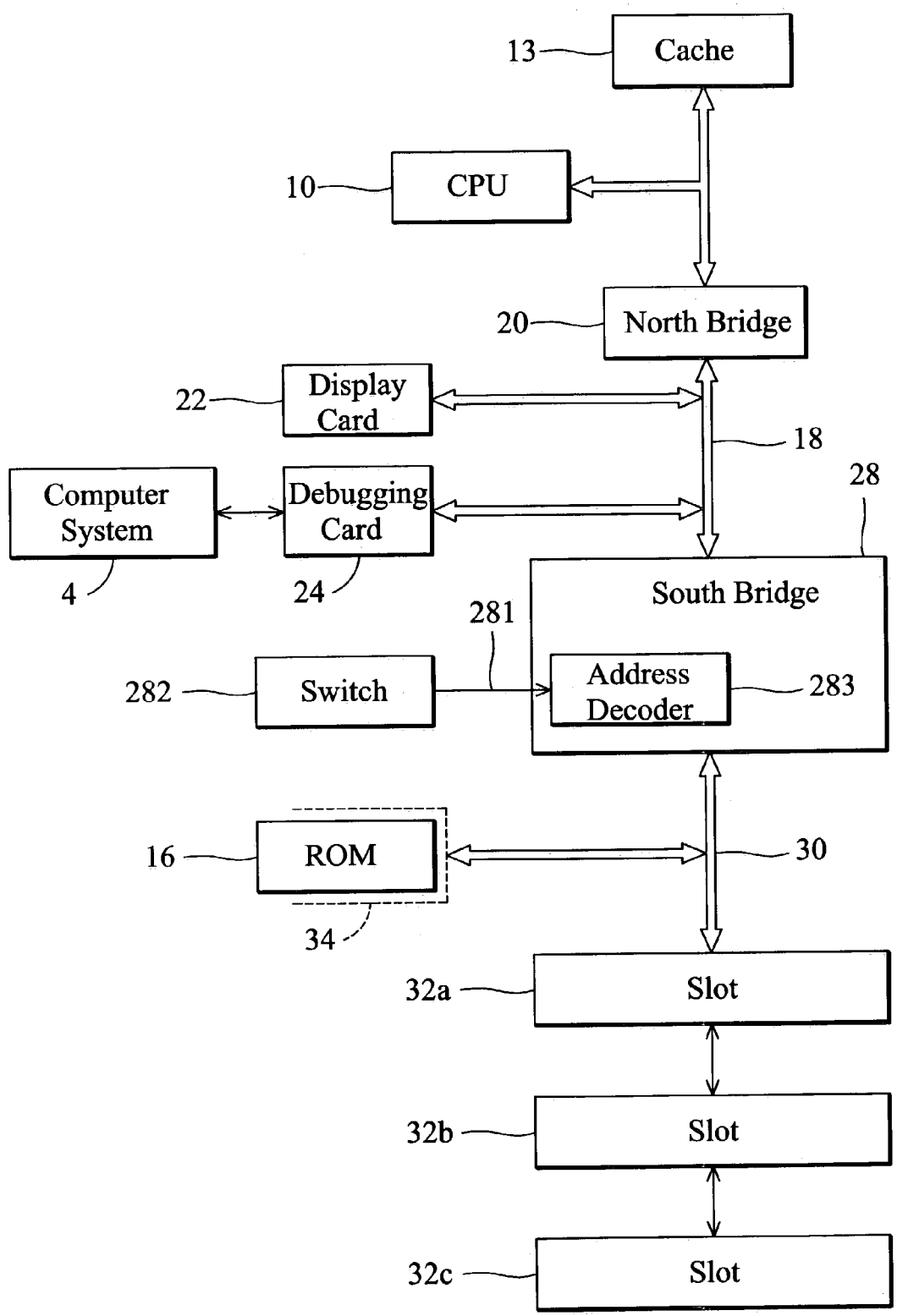
FIG. 1 is a diagram showing a computer system equipped with a BIOS debugging card according to one embodiment of the invention.

Referring now to FIG. 1, a personal computer system equipped with a debugging system is shown with the components being represented in block diagram form. The various components and buses of the computer system are typically formed on a system board or motherboard, which are well known and thus not shown. The motherboard provides the necessary wiring, card slots and other connections and various circuit components, such as capacitors and resistors, to form the system. A personal computer system typically contains a CPU 10, based on a microprocessor such as an Intel Pentium 4. The CPU 10 is connected to a CPU local bus 12, which also may have cache memory 13 connected thereto.

The local CPU bus 12 is connected to a peripheral bus 18 which in the preferred embodiment is the peripheral controller interconnect (PCI) bus by memory controller/peripheral bus host bridge (MC/PBHB) logic chip 20, which is so called "north bridge".

Various devices, such as a video device 22, can be connected to the peripheral bus 18. An interface card 24 for interconnecting the computer system with another computer system 4 for debugging is also connected to the peripheral bus 18.

The PCI bus 18 is connected through the PCI-to-expansion bus bridge 28, known as the "south bridge", to an expansion bus 30. The expansion bus 30 can be either a bus incorporating Micro Channel architecture or an ISA bus. The south bridge 28 has an address decoder 283 for the ROM 16, and further for decoding the address of ROM 16. Herein, address decoder 283 receives a logic signal (high or low) from an outside switch 282 through a strapping pin 281 of the bus bridge 28. Moreover, the logic signal is a signal that the address decoder 283 uses to decide whether to decode or not. In other words, bus bridge 28 is operated in a normal mode if the address decoder 283 is allowed to decode, and bus bridged 28 is operated in a debugging mode if the address decoder 283 is not allowed to decode. When CPU 10 routes a data request directed to the ROM 16, the PCI to expansion bus bridge 28 handles the reading of the ROM 16 so that the CPU will read the data from the ROM 16 on the expansion bus through both the PCI to expansion bus bridge 28 and the MC/PBHB logic chip 20.

Various slots 32a, 32b and 32c, are provided for connecting different devices to the expansion bus 30. Additionally, a slot 34 for connecting card 15 having ROM 16 is provided on the expansion bus 30. The ROM 16 stores the BIOS code having the initialization instructions or code.

Figure 2:
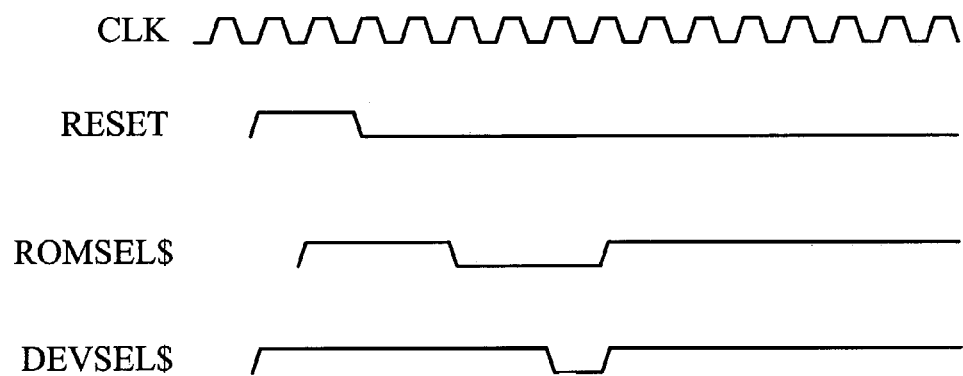
FIG. 2 is a diagram showing timing of the signals used in the computer system of FIG. 1.

FIG. 2 shows how the represented signals initialize the computer system by the BIOS ROM 16 or the debugging system respectively. First it should be noted that the specification for the PCI bus indicates the various signals that are available on the PCI bus at the MC/PBHB logic chip 20. Only the signals that are relevant to the present invention are shown in FIG. 2.

CLK indicates the clock signal which is available from the system, and RESET indicates a reset signal which on reset first goes high and then defaults low.

If the CPU routes a data request to the local bus 12 for a read cycle of the ROM 16 (normal mode) or the debugging card 24 (debugging mode), the ROMSEL$ provided by the MC/PBHB activates the logic chip 20. As used herein and according to convention, a "$" after a signal designation means "active low". The address of the directed device (ROM or debugging card) will be presented on the PCI bus according to PCI bus protocol, together with control signals to indicate that a memory read cycle is requested. According to PCI bus protocol, the directed device must activate the DEVSEL$ contact, within three clock cycles for an active decode, after the address phase for that cycle. Thus, when the CPU operates in the normal mode, the PCI-to-expansion bus bridge 28 uses ROMSEL$ signal driven from the MC/PBHB as an address decode to allow a DEVSEL$ within the three clock cycles after the address phase and retrieves the BIOS code in the ROM 16 corresponding to the address for loading the BIOS code in the CPU 10. On the other hand, when the CPU operates in the debugging mode, the PCI-to-expansion bus bridge 28 does not respond to ROMSEL$ signal but instead, the interface card 24 responds to ROMSEL$ signal with a DEVSEL$ within the three clock cycles after the address phase and retrieves its own BIOS code corresponding to the address for loading the BIOS code in the CPU 10.

Accordingly, from the previous description, it is noted that the data request for the BIOS code is routed to the debugging system when the CPU 10 is switched to debugging mode that address decoder 283 is disable. The debugging system takes the place of the south bridge 28 to respond to the signal ROMSEL$ and loads the BIOS code stored in the debugging system in the CPU 10. Thus, even if the BIOS code in the ROM 16, the ROM 16 or the south bridge 28 fails, it can be skipped by switching the CPU 10 to the debugging mode and the computer system is initialized by the debugging system. Further, the debugging card 24 may be connected to another computer system 4 through which the BIOS code in the debugging card 24 can be programmed.

Initializing the computer system by the debugging system, has the following advantages. Software applications may be installed in the computer system 4 to read data in the register of the CPU 10 during initialization. Conventionally, it is possible to read register data only by logic analysis or signal probing. If the south bridge 28 and ROM 16 function normally but the BIOS code in the ROM 16 fails, the BIOS code may be read by the computer system 4 through the debugging card for debugging. If the south bridge 28 and ROM 16 function normally but the BIOS code in the ROM 16 fails, the ROM 16 may be reprogrammed through the computer system 4.

In conclusion, the present invention provides a computer system, and further a corresponding method, capable of being initialized by a BIOS debugging card. The address decoder of the ROM BIOS is enabled or disabled by a signal received by a strapping pin of the PCI-to-expansion bus bridge (south bridge). When the address decoder is disabled, The debugging card on the PCI bus, instead of the south bridge, responds to the data request from the CPU, which skips the ROM stored BIOS code. Thus, even if the BIOS code or ROM fails, the system can be initialized through the debugging card.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method of initializing a computer system equipped with a debugging system, wherein the computer system has a CPU, a local, peripheral and expansion bus, a first and second bridge, and a ROM coupled to the expansion bus and storing a first BIOS code, and the debugging system is coupled to the peripheral bus, the method comprising the steps of:

routing data requests directed to the ROM to the local bus via the CPU;
   transferring the data requests from the local bus to the peripheral bus via the first bridge;
   switching the second bridge into a normal mode wherein the second bridge is enabled to respond to data requests on the peripheral bus with the first BIOS code in the ROM to be loaded in the CPU; and
   switching the second bridge into a debugging mode wherein the second bridge is disabled from responding to data requests on the peripheral bus, instead, the debugging system responds to data requests with the second BIOS code to be loaded in the CPU.

2. The method as claimed in claim 1, wherein the second BIOS code is programmed by the debugging system.

3. The method as claimed in claim 1, wherein the debugging system comprises:
   an interface card coupled to the peripheral bus; and
   a second computer system coupled to the interface card.

4. The method as claimed in claim 1 further comprising the step of:
   when the second bridge is switched to debugging mode, retrieving and displaying contents of registers in the CPU via the debugging system.

5. The method as claimed in claim 1 further comprising the step of:
   reading the first BIOS code from the ROM by the debugging system through the second bridge.

6. The method as claimed in claim 1 further comprising the step of:
   when the second bridge is switched to debugging mode, overwriting the first BIOS code in the ROM with the second BIOS code by the debugging system through the second bridge.

7. The method as claimed in claim 1, wherein switching between the normal and debugging mode is performed by a strapping pin of the second bridge.

8. The method as claimed in claim 1, wherein the peripheral and expansion bus are a PCI and an ISA bus, and the first and second bridge are a north and south bridge, respectively.

9. The method as claimed in claim 1, wherein the second bridge responds the first data requests by sending a device select signal to the peripheral bus, decoding addresses carried in the first data requests and retrieving the first BIOS code in the ROM corresponding to the addresses.

10. The method as claimed in claim 1, wherein the debugging system responds to the second data requests by sending a device select signal to the peripheral bus, decoding addresses carried in the second data requests and retrieving the second BIOS code therein corresponding to the addresses.

11. A computer system capable of being initialized by a debugging system, comprising:
    a CPU;
    a local, peripheral and expansion bus, wherein the CPU routes data requests to the local bus and the debugging system is coupled to the peripheral bus;
    a ROM coupled to the expansion bus and storing first BIOS code, wherein the data requests are directed to the ROM;
    a first bridge transferring the data requests from the local to the peripheral bus; and
    a second bridge switched between a normal mode wherein the second bridge is enabled to respond to data requests on the peripheral bus with the first BIOS code in the ROM to be loaded in the CPU and a debugging mode wherein the second bridge is disabled from responding to data requests on the peripheral bus, instead, the debugging system responds to data requests with the second BIOS code to be loaded in the CPU.

12. The computer system as claimed in claim 11, wherein the second BIOS code is programmed by the debugging system.

13. The computer system as claimed in claim 12, wherein the debugging system comprises:
    an interface card coupled to the peripheral bus; and
    a second computer system coupled to the interface card.

14. The computer system as claimed in claim 11, wherein the debugging system retrieves and displays contents of registers in the CPU when the second bridge is switched to debugging mode.

15. The computer system as claimed in claim 11, wherein the debugging system reads the first BIOS code from the ROM through the second bridge when the second bridge is switched to debugging mode.

16. The computer system as claimed in claim 11, wherein the debugging system overwrites the first BIOS code in the ROM with the second BIOS code through the second bridge when the second bridge is switched to debugging mode.

17. The computer system as claimed in claim 11, wherein the second bridge has a strapping pin for switching between normal and debugging mode.

18. The computer system as claimed in claim 11, wherein the peripheral and expansion bus are a PCI and ISA bus, and the first and second bridge are a north and south bridge, respectively.

19. The computer system as claimed in claim 11, wherein the second bridge responds to data requests by sending a device select signal to the peripheral bus, decoding addresses carried in the data requests and retrieving the first BIOS code in the ROM corresponding to the addresses.

20. A peripheral/expansion bus bridge in a computer system capable of being initialized by a debugging system, wherein the computer system further comprises a CPU, a local, peripheral and expansion bus, a local/peripheral bus bridge, and a ROM coupled to the expansion bus to store a first BIOS code, and the debugging system is coupled to the peripheral bus, the peripheral/expansion bus bridge comprising:
    a means for switching the peripheral/expansion bus bridge between a normal and debugging mode; and
    a decoder enabled to decode addresses carried by data requests of the CPU directed to the ROM, whereby the peripheral/expansion bus bridge sends a device select signal to the peripheral bus and retrieves the first BIOS code in the ROM corresponding to the addresses to be loaded in the CPU when the peripheral/expansion bus bridge is switched to normal mode, and disabled when the peripheral/expansion bus bridge is switched to debugging mode;

wherein, the debugging system instead responds to data requests with the second BIOS code to be loaded in the CPU when the peripheral/expansion bus bridge is switched to debugging mode.

* * * * *